US012434499B2

(12) United States Patent
Lee et al.

(10) Patent No.: US 12,434,499 B2
(45) Date of Patent: Oct. 7, 2025

(54) ENCLOSURE SYSTEM

(71) Applicant: UNIJET CO., LTD., Gyeonggi-do (KR)

(72) Inventors: Sung Jin Lee, Seoul (KR); Jae Jung Cha, Gyeonggi-do (KR)

(73) Assignee: UNIJET CO., LTD., Gyeonggi-Do (KR)

( * ) Notice: Subject to any disclaimer, the term of this patent is extended or adjusted under 35 U.S.C. 154(b) by 342 days.

(21) Appl. No.: 18/265,466

(22) PCT Filed: Sep. 2, 2021

(86) PCT No.: PCT/KR2021/011849

§ 371 (c)(1),
(2) Date: Jun. 6, 2023

(87) PCT Pub. No.: WO2022/149684

PCT Pub. Date: Jul. 14, 2022

(65) Prior Publication Data

US 2024/0033789 A1 Feb. 1, 2024

(30) Foreign Application Priority Data

Jan. 7, 2021 (KR) ........................ 10-2021-0001870

(51) Int. Cl.
*B41J 3/46* (2006.01)
*B08B 15/02* (2006.01)
*B41J 29/13* (2006.01)

(52) U.S. Cl.
CPC ............... *B41J 29/13* (2013.01); *B08B 15/02* (2013.01); *B41J 3/46* (2013.01)

(58) Field of Classification Search
CPC .. B41J 3/46; B41J 29/13; B08B 15/02; H01L 21/6719
See application file for complete search history.

(56) References Cited

U.S. PATENT DOCUMENTS 5,558,717 A * 9/1996 Zhao ................. H01L 21/68742 118/728
5,959,409 A * 9/1999 Dornfest ........... H01J 37/32559 156/345.47

(Continued)

FOREIGN PATENT DOCUMENTS

EP 2 973 676 B1 11/2018
KR 10-2004-0110862 A 12/2004

(Continued)

OTHER PUBLICATIONS

International Search Report for PCT/KR2021/011849 mailed on Apr. 12, 2022.

(Continued)

*Primary Examiner* — Anh T Vo
(74) *Attorney, Agent, or Firm* — The PL Law Group, PLLC

(57) ABSTRACT

An enclosure system includes a process unit moving chamber, a management unit moving chamber, and a fixed chamber. The process unit moving chamber includes a first maintenance opening hole through which one side portion of a process unit is exposed and a second maintenance opening hole through which the other side portion of the process unit is exposed, and the process unit moving chamber moves integrally with the process unit. The management unit moving chamber includes a management opening hole through which a management portion of a management unit is exposed, and moves integrally with the management unit. The fixed chamber is connected to a door installed at one side wall part of an enclosure, and includes a docking opening hole extending toward the inside of the enclosure.

11 Claims, 10 Drawing Sheets

(56) References Cited

U.S. PATENT DOCUMENTS

| | | | | |
|---|---|---|---|---|
| 6,035,804 A * | 3/2000 | Arami | ..................... | C23C 16/44<br>118/728 |
| 6,899,786 B2 * | 5/2005 | Senzaki | ............ | H01J 37/32458<br>156/345.43 |

FOREIGN PATENT DOCUMENTS

| | | | |
|---|---|---|---|
| KR | 10-2013-0009597 | A | 1/2013 |
| KR | 10-2014-0139192 | A | 12/2014 |
| KR | 10-2016-0060868 | A | 5/2016 |
| KR | 10-1831313 | B1 | 2/2018 |
| KR | 10-2018-0041891 | A | 4/2018 |
| KR | 10-2019-0070541 | A | 6/2019 |
| WO | WO 2013/096503 | A1 | 6/2013 |

OTHER PUBLICATIONS

Office action issued on Apr. 23, 2022 from Korean Patent Office in a counterpart Korean Patent Application No. 10-2021-0001870 (all the cited references are listed in this IDS.) (English translation is also submitted herewith.).

European Search Report For EP21917846.4 issued on Oct. 1, 2024 from European patent office in a counterpart European patent application.

* cited by examiner

ENCLOSURE SYSTEM

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2021/011849, filed Sep. 2, 2021, which claims priority to the benefit of Korean Patent Application No. 10-2021-0001870 filed in the Korean Intellectual Property Office on Jan. 7, 2021, the entire contents of which are incorporated herein by reference.

BACKGROUND

1. Technical Field

The present invention relates to an enclosure system, and more particularly, to an enclosure system which enables a worker to maintain equipment inside an enclosure while keeping a gas atmosphere inside the enclosure.

2. Background Art

When industrial inkjet equipment is used, inkjet head maintenance such as wiping a surface of an inkjet head or applying pressure to a nozzle in a poor state to eject ink for cleaning is required. The inkjet head maintenance is performed at regular intervals.

After the inkjet head maintenance is performed, a process of checking whether speed and straightness of ink drops ejected from the inkjet head are in a good state is performed.

As described above, the inkjet head requiring replacement is replaced with a new inkjet head through the inkjet head maintenance and checking of an operating state of the inkjet head.

A process of manufacturing an organic light emitting diode (OLED) and a quantum dot organic light emitting diode (QD-OLED) is performed in an inner sealed space of an enclosure in which an atmosphere is created with a special gas to minimize impurity particles that cause product defects.

The process is performed as the inkjet head is installed in the inner sealed space of the enclosure, and the inkjet head is replaced after the inner sealed space of the enclosure is replaced with an atmospheric environment through an antechamber connected to the outside to replace the inkjet head requiring replacement through maintenance with a new inkjet head.

In recent years, a display to which the organic light emitting diode or the quantum dot organic light emitting diode is applied gradually increases in size to 75 inches or more, and equipment for manufacturing the display is produced by using maximum 10th generation glass.

Due to this reason, the enclosure also gradually increases in size, and as described above, much time is required to create an atmosphere in the inner sealed space of the enclosure with a special gas for performing the process again after replacing the inner sealed space of the enclosure with the atmospheric environment.

For example, an atmosphere is formed in the enclosure with a special gas such as a high-purity nitrogen gas or helium gas, after an environment in which a worker may access is created as clean dry air (CDA) is supplied into the enclosure to discharge an existing gas in order to replace the inkjet head, the inkjet head is replaced by opening a door of the enclosure, and after the door of the enclosure is closed when replacement of the inkjet head is completed, a special gas is supplied into the enclosure to discharge existing CDA, thereby creating an original process atmosphere.

Specifically, in order to create the original process atmosphere, the high-purity special gas is supplied into the enclosure at 2000 L per minute so that moisture and oxygen are below 50 PPM, and this process requires at least 5 hours.

Also, depending on purposes, an additional process of reducing moisture and oxygen using an additional purifier is required to make an inner environment of the enclosure below 1 PPM, and this additional process requires about 3 hours.

As described above, the process of converting and returning the inner atmosphere of the enclosure for the inkjet head maintenance or the replacement of the inkjet head requires considerable time.

SUMMARY

The present invention provides an enclosure system capable of increasing work stability and reducing maintenance time in such a manner that a worker maintains equipment inside the enclosure while keeping a gas atmosphere inside the enclosure when maintaining industrial equipment installed in the enclosure for manufacturing a large-size display in order to solve the problems of the related art.

In order to solve the above-described technical problem, an embodiment of the present invention provides an enclosure system including: a process unit moving chamber including a first maintenance opening hole through which one side portion of a process unit is exposed and a second maintenance opening hole through which the other side portion of the process unit is exposed, the process unit moving chamber moving integrally with the process unit; a management unit moving chamber including a management opening hole through which a management portion of a management unit is exposed and moving integrally with the management unit; and a fixed chamber connected to a door installed at one side wall part of an enclosure to form a predetermined space, the fixed chamber including a docking opening hole extending toward the inside of the enclosure. Here, through movement of the process unit and the management unit, the process unit moving chamber and the management unit moving chamber come in close contact with each other to allow the first maintenance opening hole and the management opening hole to communicate with each other, the process unit moving chamber and the fixed chamber come in close contact to allow the second maintenance opening hole and the docking opening hole to communicate with each other, and thus the process unit moving chamber, the management unit moving chamber, and the fixed chamber form one sealed space.

Preferably, the process unit moving chamber may have a rectangular shape, the first maintenance opening hole may be formed in a bottom surface thereof, the second maintenance opening hole may be formed in one side surface thereof, the management unit moving chamber may have a rectangular shape, the management opening hole may be formed in a top surface thereof, the fixed chamber may have a rectangular shape, and the docking opening hole may be formed in a direction facing the second maintenance opening hole.

Preferably, the fixed chamber may include: an outer frame having an opened central portion and disposed in a space of the fixed chamber; a docking frame having an opened central portion and disposed in the enclosure; a plurality of connecting rods passing through the inside and outside of the enclosure to integrally connect the outer frame and the docking frame; a guide bushing which is disposed in the enclosure to allow the plurality of connecting rods to slide in a longitudinal direction and into which the plurality of connecting rods are inserted; a driving unit configured to provide driving force so that the plurality of connecting rods slide in the longitudinal direction; the docking opening hole formed in the enclosure in correspondence with an opening of the outer frame and an opening of the docking frame; and a flexible connecting pipe configured to connect the docking opening hole and the opening of the docking frame.

Preferably, a flange part may extend from one side surface of the process unit moving chamber, at least one guide hole may be formed in one of the flange part and a corresponding surface of the docking frame facing the flange part, and a guide pin inserted into the guide hole may be formed on the other.

Preferably, a first O-ring groove may be formed in one of an outer periphery of the first maintenance opening hole and an outer periphery of the management opening hole, into which a first O-ring is inserted, and a first O-ring sealing surface facing the first O-ring groove to compress the first O-ring may be formed on the other.

Preferably, a second O-ring groove may be formed in one of an outer periphery of the second maintenance opening hole and an outer periphery of the opening of the docking frame, into which a second O-ring is inserted, and a second O-ring sealing surface facing the second O-ring groove to compress the second O-ring may be formed on the other.

Preferably, a sensor unit configured to detect a pressure state and a gas state may be disposed on one of the process unit moving chamber, the management unit moving chamber, and the fixed chamber.

Preferably, a gas supply hole through which an atmosphere gas is supplied, an air supply hole through which clean dry air (CDA) is supplied, and an exhaust hole through which the atmosphere gas or the CDA is exhausted may be formed in one of the process unit moving chamber, the management unit moving chamber, and the fixed chamber.

Preferably, when a horizontal direction on a plane of the enclosure is an X-axis, a vertical direction on the plane of the enclosure is a Y-axis, and a height direction of the enclosure is a Z-axis, the process unit may be movable in an X-axis direction and a Z-axis direction, the management unit may be movable in a Y-axis direction and the Z-axis direction, in a state in which the process unit moving chamber is moved and aligned in correspondence with an X-axis coordinate of the management unit moving chamber, and the management unit moving chamber is moved and aligned in correspondence with a Y-axis coordinate of the process unit moving chamber, the process unit moving chamber and the management unit moving chamber may come in close contact with each other as at least one of the process unit moving chamber and the management unit moving chamber is moved in the Z-axis direction, and the process unit moving chamber may be aligned in correspondence with a Z-axis coordinate of the fixed chamber while maintaining the state in which the process unit moving chamber and the management unit moving chamber come in close contact with each other.

Preferably, when a horizontal direction on a plane of the enclosure is an X-axis, a vertical direction on the plane of the enclosure is a Y-axis, and a height direction of the enclosure is a Z-axis, the process unit may be movable in an X-axis direction and a Z-axis direction, the management unit may be movable in a Y-axis direction and the Z-axis direction, and in a state in which the process unit moving chamber is moved and aligned in correspondence with an X-axis coordinate of the management unit moving chamber and a Z-axis coordinate of the fixed chamber, and the management unit moving chamber is moved and aligned in correspondence with a Y-axis coordinate of the process unit moving chamber, the process unit moving chamber and the management unit moving chamber may come in close contact with each other as the management unit moving chamber is moved in the Z-axis direction.

Preferably, the management unit disposed in the management unit moving chamber may include at least one vision inspection device of a maintenance vision inspection device for maintaining the process unit and an operation checking vision inspection device for inspecting an operation state of the process unit.

The above-described present invention has the advantage of increasing the work stability and reducing the maintenance time by enabling the worker to maintain the equipment inside the enclosure while keeping the gas atmosphere inside the enclosure when maintaining the industrial equipment installed inside the enclosure for manufacturing the large-size display.

The object of the present invention is not limited to the aforesaid, but other objects not described herein will be clearly understood by those skilled in the art from descriptions below.

DETAILED DESCRIPTION

Figure 1A:
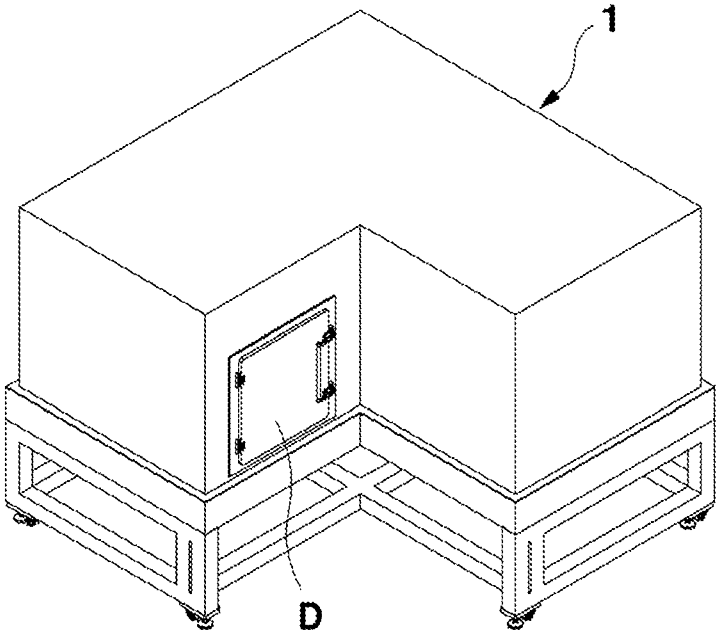
FIGS. 1A and 1B are a perspective view illustrating an enclosure system according to an embodiment of the present invention.
Figure 1B:
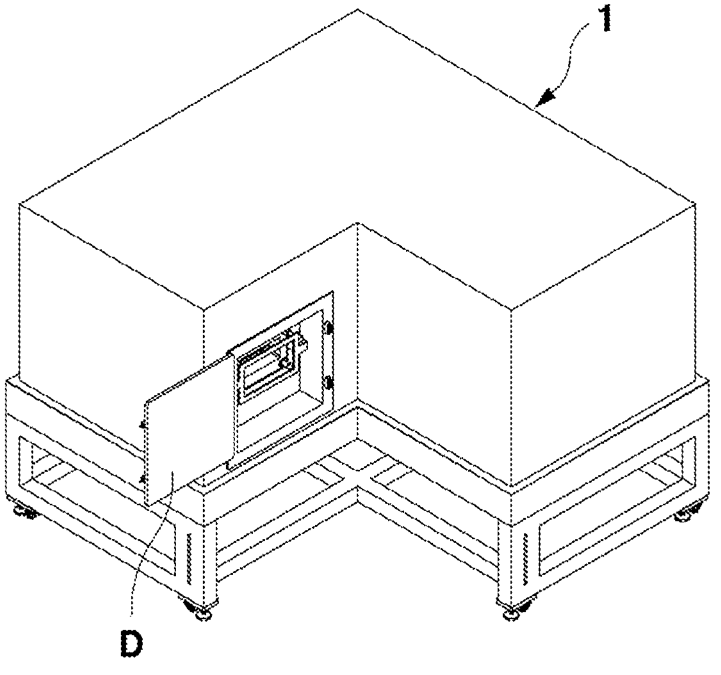

The present invention may be carried out in various embodiments without departing from the technical ideas or primary features. Therefore, the embodiments of the present invention are merely illustrative, but should not be limitedly interpreted.

It will be understood that although the terms of first and second are used herein to describe various elements, these elements should not be limited by these terms.

The terms are only used to distinguish one component from other components. For example, a first element referred to as a first element in one embodiment can be referred to as a second element in another embodiment.

As used herein, the term and/or includes any and all combinations of one or more of the associated listed items.

It will also be understood that when an element is referred to as being "connected to" or "engaged with" another element, it can be directly connected to the other element, or intervening elements may also be present.

It will also be understood that when an element is referred to as being 'directly connected to' another element, there is no intervening elements.

In the following description, the technical terms are used only for explaining a specific exemplary embodiment while not limiting the present invention. The terms of a singular form may include plural forms unless referred to the contrary.

The meaning of 'include' or 'comprise' specifies a property, a number, a step, a process, an element, a component, or a combination thereof in the specification but does not exclude other properties, numbers, steps, processes, elements, components, or combinations thereof.

Unless terms used in the present disclosure are defined differently, the terms may be construed as meaning known to those skilled in the art.

Terms such as terms that are generally used and have been in dictionaries should be construed as having meanings matched with contextual meanings in the art. In this description, unless defined clearly, terms are not ideally, excessively construed as formal meanings.

Hereinafter, embodiments disclosed in this specification is described with reference to the accompanying drawings, and the same or corresponding components are given with the same drawing number regardless of reference number, and their duplicated description will be omitted.

Moreover, detailed descriptions related to well-known functions or configurations will be ruled out in order not to unnecessarily obscure subject matters of the present invention.

As illustrated in FIGS. 1A to 5, an enclosure system including an enclosure 1 for creating a specific process environment according to an embodiment of the present invention includes a process unit moving chamber 100, a management unit moving chamber 200, and a fixed chamber 300.

The process unit moving chamber 100 has a first maintenance opening hole **100*h*1 through which one side portion of a process unit IH is exposed and a second maintenance opening hole 100*h*2** through which the other portion of the process unit is exposed.

The management unit moving chamber 200 has a management opening hole **200*h*** through which a management part of a management unit VC is exposed.

The fixed chamber 300 is connected to a door D disposed on one side wall part W of the enclosure 1 to form a predetermined space s and has a docking opening hole 306 formed toward an inner space s' of the enclosure 1.

The process unit IH and the management unit VC may be installed to move in the inner space s' of the enclosure 1, and through movement of the process unit IH and the management unit VC, the process unit moving chamber 100, the management unit moving chamber 200, and the fixed chamber 300 may form one sealed space. Hereinafter, each component will be described in detail.

In the enclosure system of the embodiment, the process unit IH may be an inkjet head module IH, and the management unit VC may include at least one vision inspection device of a maintenance vision inspection device for checking and maintaining a state of a nozzle of the inkjet head module IH and an operation checking vision inspection device for inspecting an ink drop ejected from the nozzle of the inkjet head module IH.

Hereinafter, a case in which the process unit includes the inkjet head module IH, and the management unit includes the vision inspection device VC will be described as an example.

In addition to the inkjet head module IH and the vision inspection device VC described above, the process unit and the management unit may include other devices constituting various industrial equipment.

Firstly, the process unit moving chamber 100 will be described.

Figure 2:
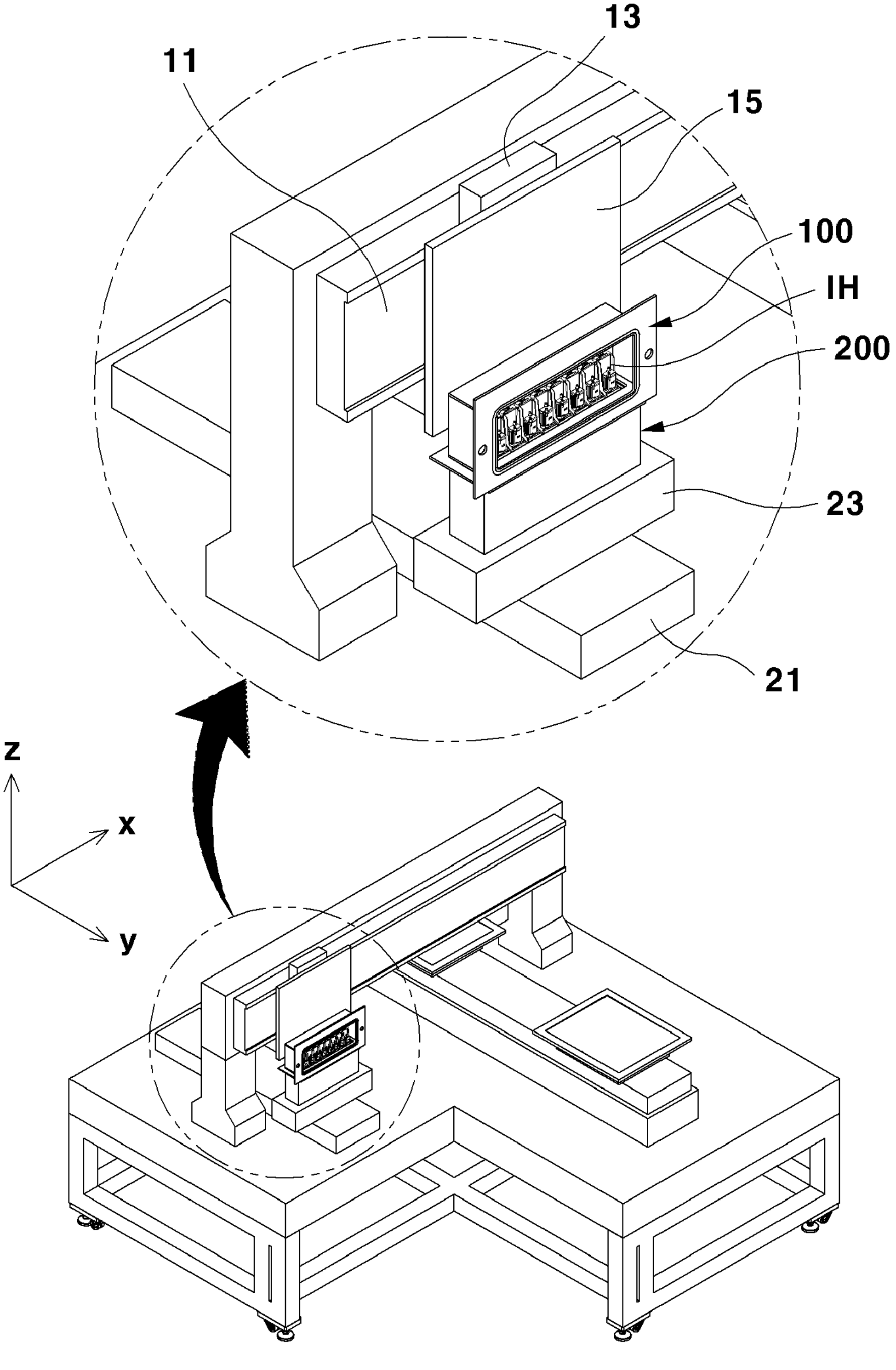
FIG. 2 is a perspective view illustrating industrial equipment installed inside the enclosure system according to an embodiment of the present invention.
Figure 5:
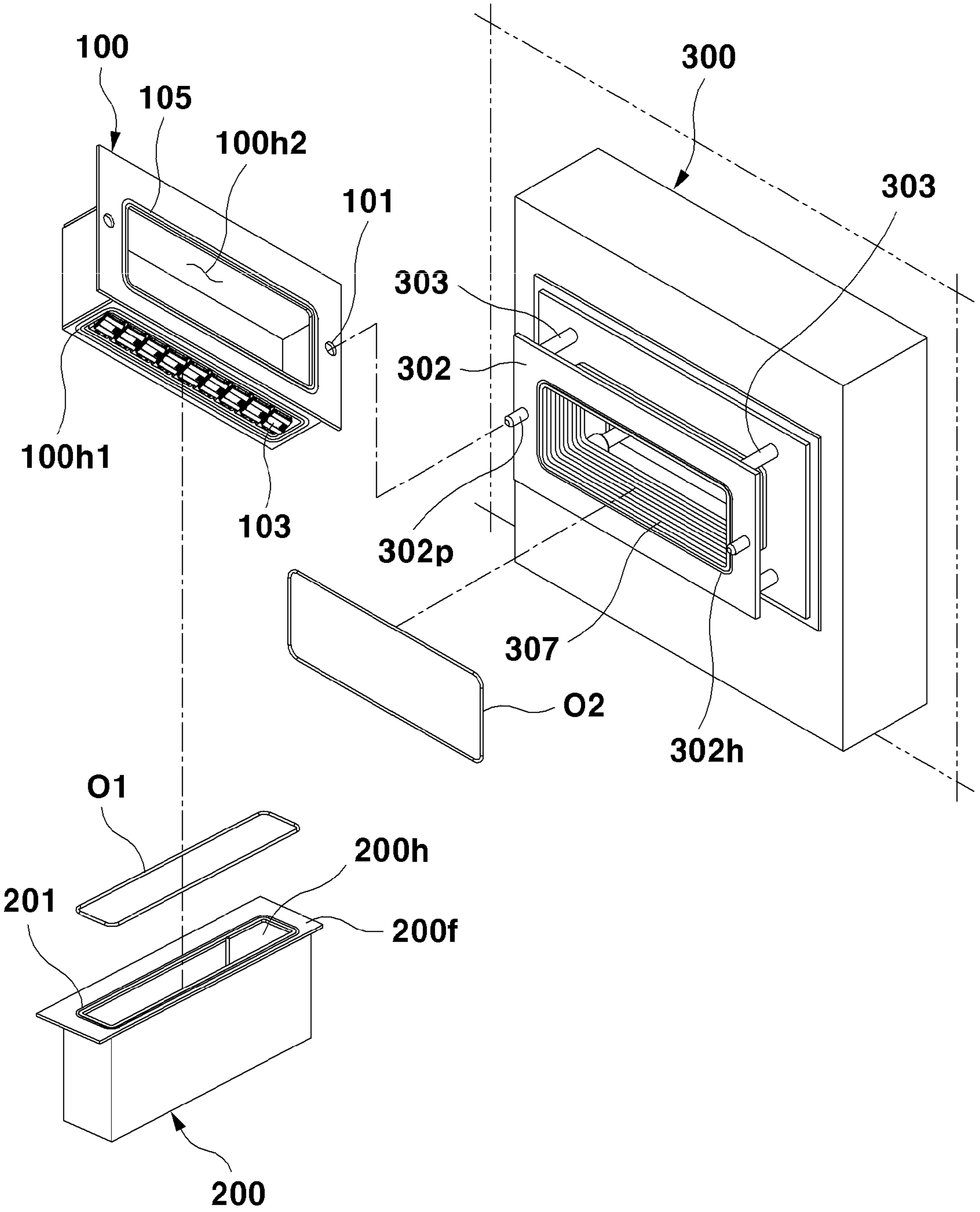
FIG. 5 is an exploded perspective view of FIG. 4.

As illustrated in FIGS. 2 and 5, the process unit moving chamber 100 may surround the inkjet head module IH to move integrally with the inkjet head module IH when the inkjet head module IH is moved.

Specifically, as illustrated in FIG. 2, when a horizontal direction on a plane of the enclosure 1 is an X-axis, a vertical direction on the plane of the enclosure 1 is a Y-axis, and a height direction of the enclosure 1 is a Z-axis, a Z-axis rail part 13 may slide-move along an X-axis rail part 11 in an X-axis direction, a moving block 15 may slide-move along the Z-axis rail part 13 in a Z-axis direction, and the process unit moving chamber 100 and the inkjet head module IH may be installed on the moving block 15 to slide-move along the X-axis direction or the Z-axis direction.

The process unit moving chamber 100 has an approximately rectangular shape, a first maintenance opening hole **100*h*1 through which a nozzle portion of the inkjet head module IH is exposed is formed in a bottom surface thereof, and a second maintenance opening hole 100*h*2** through which a side portion of the inkjet head module IH is exposed is formed in one side surface thereof.

As illustrated in FIG. 5, the second maintenance opening hole **100*h*2 may be formed in a side portion of the process unit moving chamber 100** corresponding to a direction in which a plurality of heads of the inkjet head module IH are arranged.

A flange part **100*f* extends from one side surface of the process unit moving chamber 100 in which the second maintenance opening hole 100*h*2 is formed, and a guide hole 101 is formed on each of both side surfaces of the flange part 100*f***.

The guide hole 101 that is for docking with a docking frame 302 of the fixed chamber 300 will be additionally described when the fixed chamber 300 is described.

A first O-ring sealing surface 103 is formed on an outer periphery of the first maintenance opening hole **100*h*1, and a second O-ring sealing surface 105 is formed on an outer periphery of the second maintenance opening hole 100*h*2. The first O-ring sealing surface 103 is a portion compressing a first O-ring O1 when the process unit moving chamber 100 and the management unit moving chamber 200 come in close contact with each other, and the second O-ring sealing surface 105 is a portion compressing a second O-ring O2 when the process unit moving chamber 100** and the fixed chamber come in close contact with each other.

According to the above-described configuration of the process unit moving chamber 100, the process unit moving chamber 100 may slide-move integrally with the inkjet head module IH when the inkjet head module IH is slide-moved in the X-axis or the Z-axis in a state in which the process unit moving chamber 100 surrounds the rest portion except for one side portion and a lower portion of the inkjet head module IH.

Next, the management unit moving chamber 200 will be described.

As illustrated in FIGS. 2 and 5, the management unit moving chamber 200 may surround at least one vision inspection device VC to move integrally with the vision inspection device VC when the vision inspection device VC is moved.

Specifically, as illustrated in FIG. 2, as a Z-axis rail block 23 may slide-move along the Y-axis rail part 21 in the Y-axis direction, and the management unit moving chamber 200 may be elevated in the Z-axis direction by an elevation unit (not shown) disposed on the Z-axis rail block 23, the management unit moving chamber 200 may slide-move in the Y-axis direction or the Z-axis direction.

The management unit moving chamber 200 has an approximately rectangular shape, and the management opening hole 200*h* through which a portion facing a camera of a management portion of the vision inspection device VC is exposed is formed in a top surface thereof.

A flange part 200*f* may extend from a top surface of the management unit moving chamber 200 in which the management opening hole 200*h* is formed, and a first O-ring groove 201 is formed and inserted into an outer periphery of the management opening hole 200*h* on the flange part 200*f*.

The first O-ring groove 201 has a depth less than a diameter of the first O-ring O1, and the first O-ring O1 inserted into the first O-ring groove 201 is compressed by the first O-ring sealing surface 103 when the management unit moving chamber 200 and the process unit moving chamber 100 comes in close contact with each other.

That is, a sealed state may be formed as an upper portion of the management unit moving chamber 200 and a lower portion of the process unit moving chamber 100 come in close contact with each other in such a manner that the first O-ring sealing surface 103 formed on an outer periphery of the first maintenance opening hole 100*h*1 formed in a bottom surface of the process unit moving chamber 100 contacts the first O-ring O1 inserted into the first O-ring groove 201.

According to the above-described configuration of the management unit moving chamber 200, the management unit moving chamber 200 may slide-move integrally with the vision inspection device VC when the vision inspection device VC is slide-moved in the Y-axis and Z-axis in a state in which the management unit moving chamber 200 surrounds the rest portion except for an upper portion of the vision inspection device VC.

Next, the fixed chamber 300 will be described.

Figure 3:
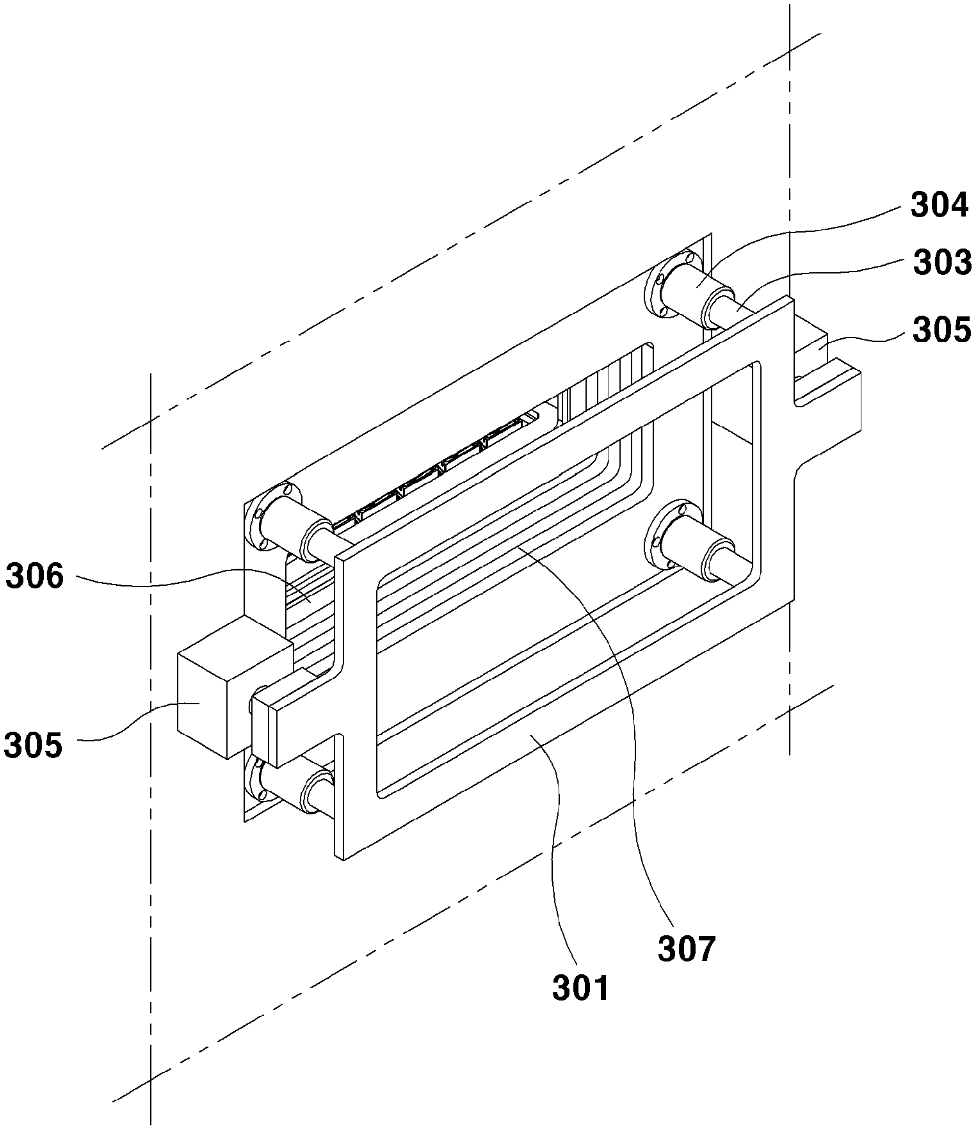
FIG. 3 is a perspective view illustrating a component of a fixed chamber of the enclosure system according to an embodiment of the present invention.
Figure 4:
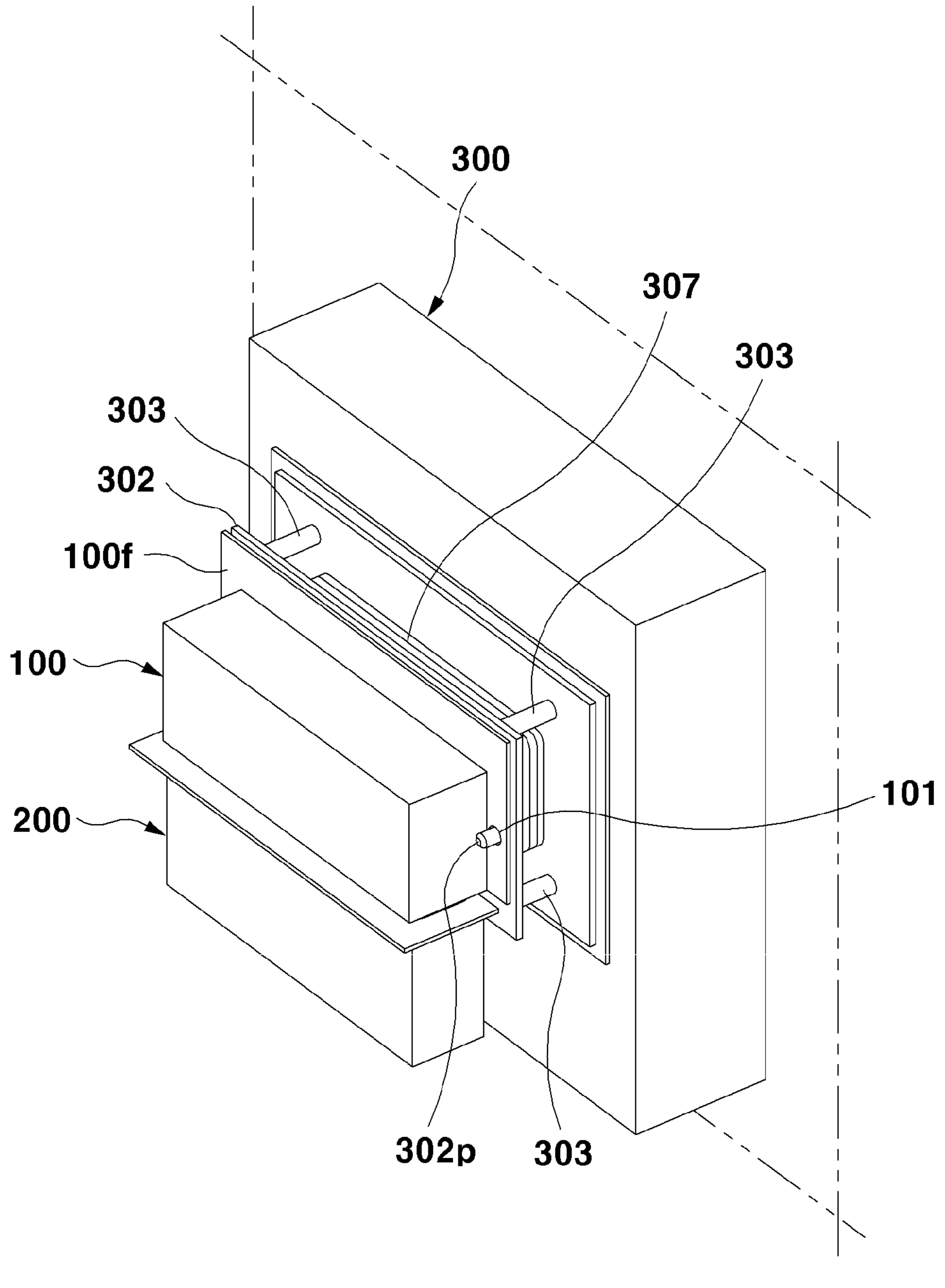
FIG. 4 is a perspective view illustrating a state in which one sealed space is formed by a process unit moving chamber, a management unit moving chamber, and a fixed chamber of the enclosure system according to an embodiment of the present invention.

As illustrated in FIG. 3 or 5, the fixed chamber 300 is connected to the door D installed on the one side wall part W of the enclosure 1 to have a predetermined space s having an approximately rectangular shape.

In the embodiment, the fixed chamber 300 includes all components described below instead of indicating only the space s.

Specifically, the fixed chamber 300 includes an outer frame 301, a docking frame 302, a plurality of connecting rods 303, a guide bushing 304, a driving unit 305, a docking opening hole 306, and a flexible connecting pipe 307.

The outer frame 301 that is a rectangular frame having a rectangular opening in a central portion thereof is disposed in the rectangular shaped space of the fixed chamber 300, and the docking frame 302 that is a rectangular frame having a rectangular opening in a central portion thereof is disposed in the inner space s' of the enclosure 1. The outer frame 301 and the docking frame 302 may have substantially similar shapes.

A guide pin 302*p* inserted into the guide hole 101 is formed on a corresponding surface of the docking frame 302 facing the flange part 100*f* formed on one side surface of the process unit moving chamber 100. Thus, when the process unit moving chamber 100 and the fixed chamber 300 come in close contact with each other, mutual movement thereof may be guided by the guide hole 101 and the guide pin 302*p*.

As a second O-ring groove 302*h* is formed on the corresponding surface of the docking frame 302 facing the flange part 100*f* formed on one side surface of the process unit moving chamber 100, the second O-ring O2 is inserted thereto.

The second O-ring groove 302*h* has a depth less than a diameter of the second O-ring O2, and the second O-ring O2 inserted into the second O-ring groove 302*h* is compressed by the second O-ring sealing surface 105 when the process unit moving chamber 100 and the fixed chamber 300 come in close contact with each other.

That is, a sealed state may be formed as one side surface of the process unit moving chamber 100 and a corresponding portion of the fixed chamber 300 come in close contact with each other in such a manner that the second O-ring sealing surface 105 formed on an outer periphery of the second maintenance opening hole 100*h*2 formed in one side surface of the process unit moving chamber 100 contacts the second O-ring O2 inserted into the second O-ring groove 302*h*.

The plurality of connecting rods 303 that are members connecting integrally each corner portion of the outer frame 301 and the docking frame 302 so that the outer frame 301 and the docking frame 302 are parallel to each other and maintain a constant interval therebetween pass through the inner space s' of the enclosure 1 and the space s of the fixed chamber 300 through the guide bushing 304.

The guide bushing 304 may be disposed on the wall part W of the enclosure 1 so that the plurality of the connecting rods 303 slide-move along a longitudinal direction, and the plurality of the connecting rods 303 may repeatedly perform linear movement in the longitudinal direction by the guide bushing 304.

The guide bushing 304 may repeatedly perform linear movement by the driving unit 305, and the driving unit 305 may be disposed on an outer side of the wall part W of the enclosure 1 and connected to the outer frame 301. For example, the driving unit 305 may include various types of driving devices such as a motor such as a linear motor and a screw motor and a cylinder such as a pneumatic cylinder and a hydraulic cylinder.

Thus, when the outer frame 301 is moved close to the wall part W of the enclosure W by driving of the driving unit 305, the docking frame 302 connected through the plurality of connecting rods 303 is moved in the same direction as the outer frame 301.

Also, when the outer frame 301 is spaced apart from the wall part W of the enclosure 1 by the driving of the driving unit 305, the docking frame 302 connected through the plurality of the connecting rods 303 is moved in the same direction as the outer frame 301.

The docking opening hole 306 that is a hole formed toward the inner space s' of the enclosure 1 in the space formed by the fixed chamber 300 may be formed in a direction in which the docking opening hole 306 faces the second maintenance opening hole 100*h*2 of the process unit moving chamber 100.

Also, the docking opening hole 306 may have a rectangular shape corresponding to an opening of the outer frame 301 and an opening of the docking frame 302.

All of the central rectangular opening of the outer frame 301, the central rectangular opening of the docking frame 302, and the rectangular docking opening hole 306 are arranged in a row.

The flexible connecting pipe 307 that is a portion for connecting the docking opening hole 306 and the opening of the docking frame 302 may include a connecting pipe made of a flexible material such as rubber or a metal connecting pipe having a bellows shape.

According to the above-described configuration of the fixed chamber 300, the fixed chamber 300 may be connected to the portion in which the door D of the enclosure is installed to form a predetermined space s and selectively docked with the process unit moving chamber 100.

Although not shown in the drawing, a sensor unit for detecting a pressure state and a gas state may be disposed on one of the process unit moving chamber 100, the management unit moving chamber 200, and the fixed chamber 300.

Also, although not shown in the drawing, a gas supply hole for supplying an atmospheric gas, an air supply for supplying clean dry air (CDA), and an exhaust hole for exhausting the atmospheric gas or the CDA may be defined in one of the process unit moving chamber 100, the management unit moving chamber 200, and the fixed chamber 300.

As described above, the enclosure system including the process unit moving chamber 100, the management unit moving chamber 200, and the fixed chamber 300 according to an embodiment of the present invention is configured such that the first maintenance opening hole **100*h*1 and the management opening hole 200*h* communicate with each other as the process unit moving chamber 100 and the management unit moving chamber 200 come in close contact with each other by movement of the inkjet head module IH and the vision inspection device VC, and the process unit moving chamber 100, the management unit moving chamber 200, and the fixed chamber 300 form one sealed space as the process unit moving chamber 100 and the fixed chamber 300 come in close contact with each other to allow the second maintenance opening hole 100*h* and the docking opening hole 306 to communicate with each other. Operations of the process unit moving chamber 100, the management unit moving chamber 200, and the fixed chamber 300** will be described in detail.

Figure 6:
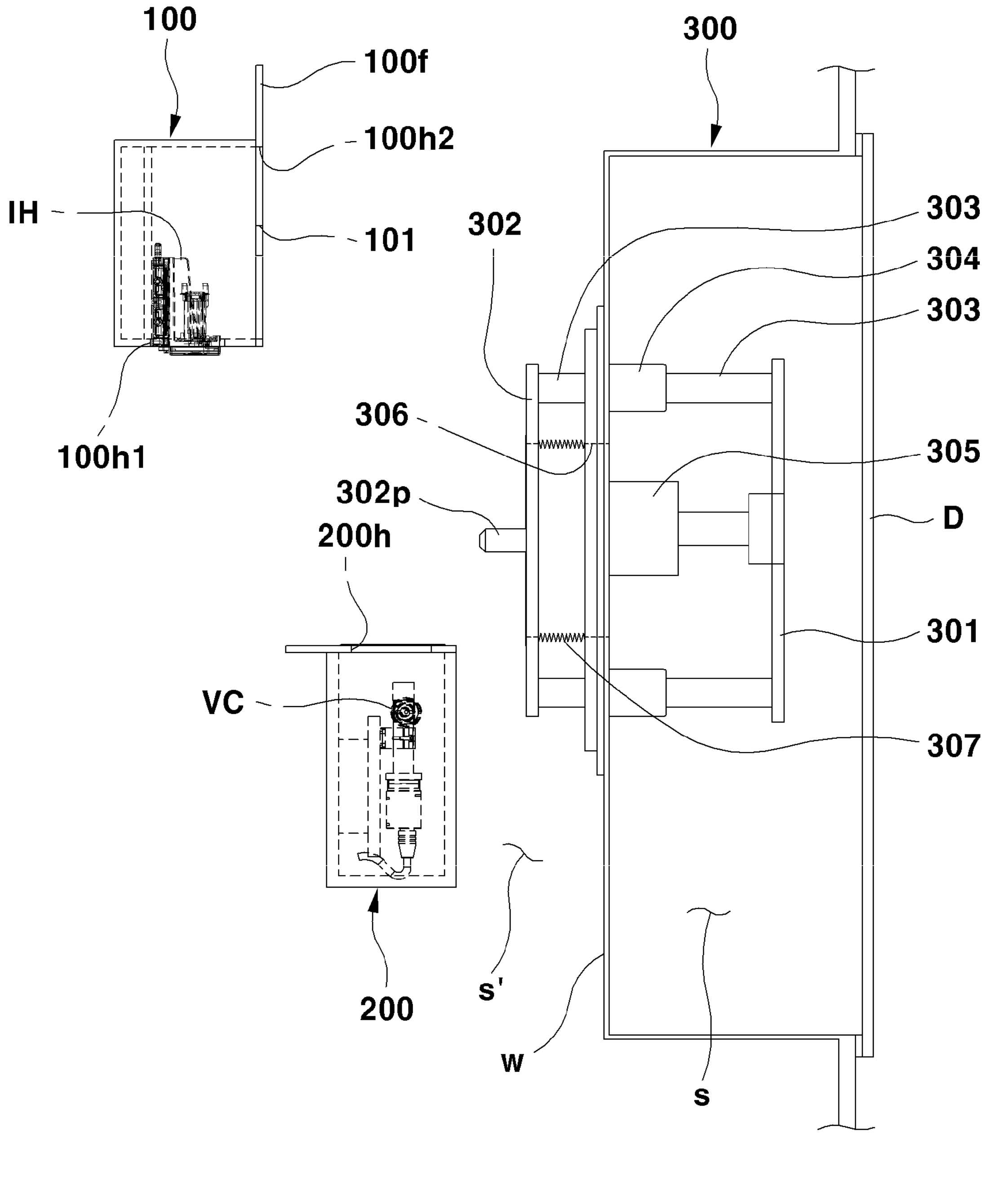
FIGS. 6 to 10 are views for explaining an operation of the process unit moving chamber, the management unit moving chamber, and the fixed chamber of the enclosure system according to an embodiment of the present invention.
Figure 7:
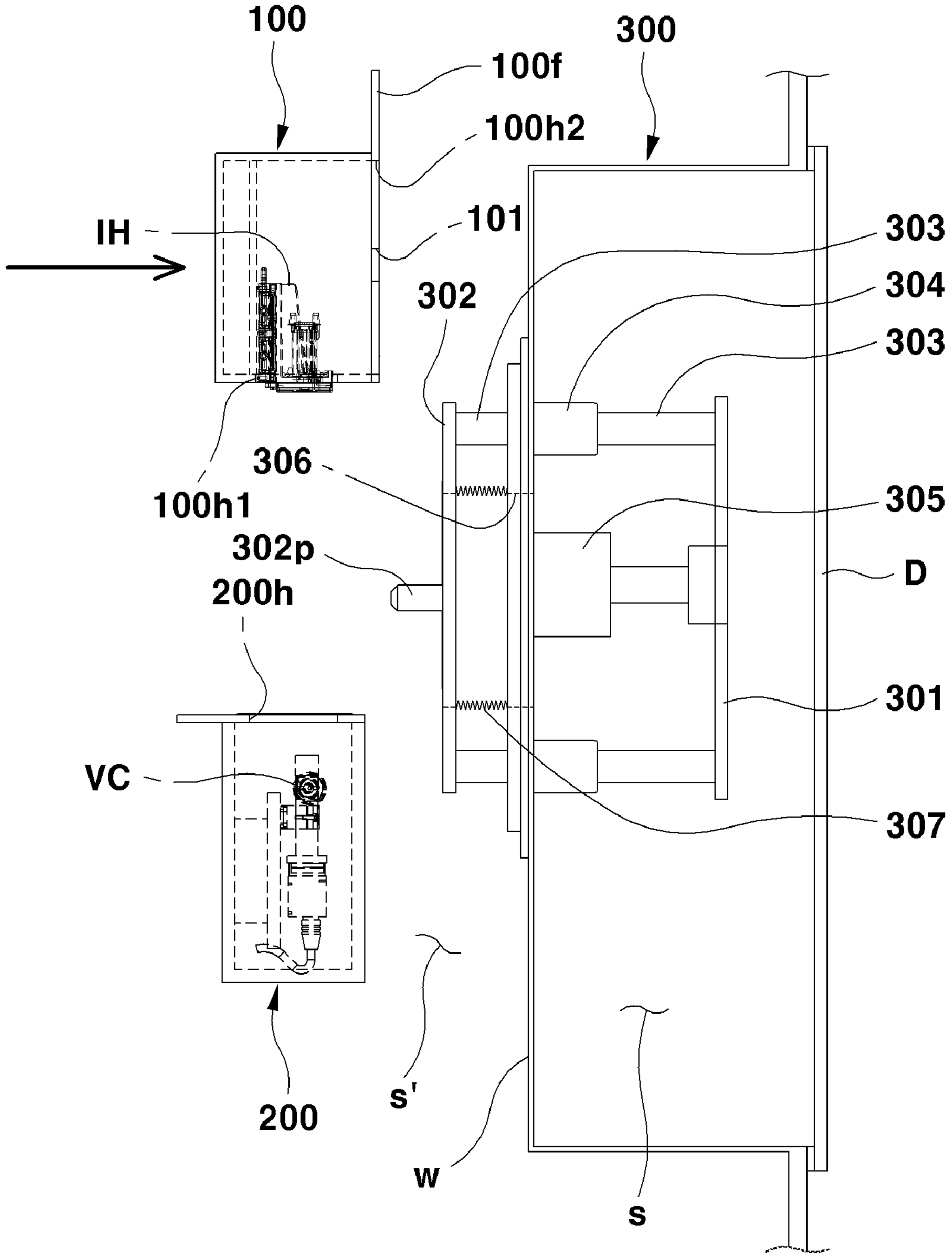

First, the process unit moving chamber 100 is moved and aligned in correspondence with an X-axis coordinate of the management unit moving chamber 200 to convert a state in FIG. 6 into a state in FIG. 7.

Thereafter, the management unit moving chamber 200 is moved and aligned in correspondence with a Y-axis coordinate of the process unit moving chamber 100.

A movement order of the process unit moving chamber 100 and the management unit moving chamber 200 may be changed.

Through the above-described process, the X and Y coordinates of process unit moving chamber 100 and the X and Y coordinates of the management unit moving chamber 200 may be matched and aligned.

Figure 8:
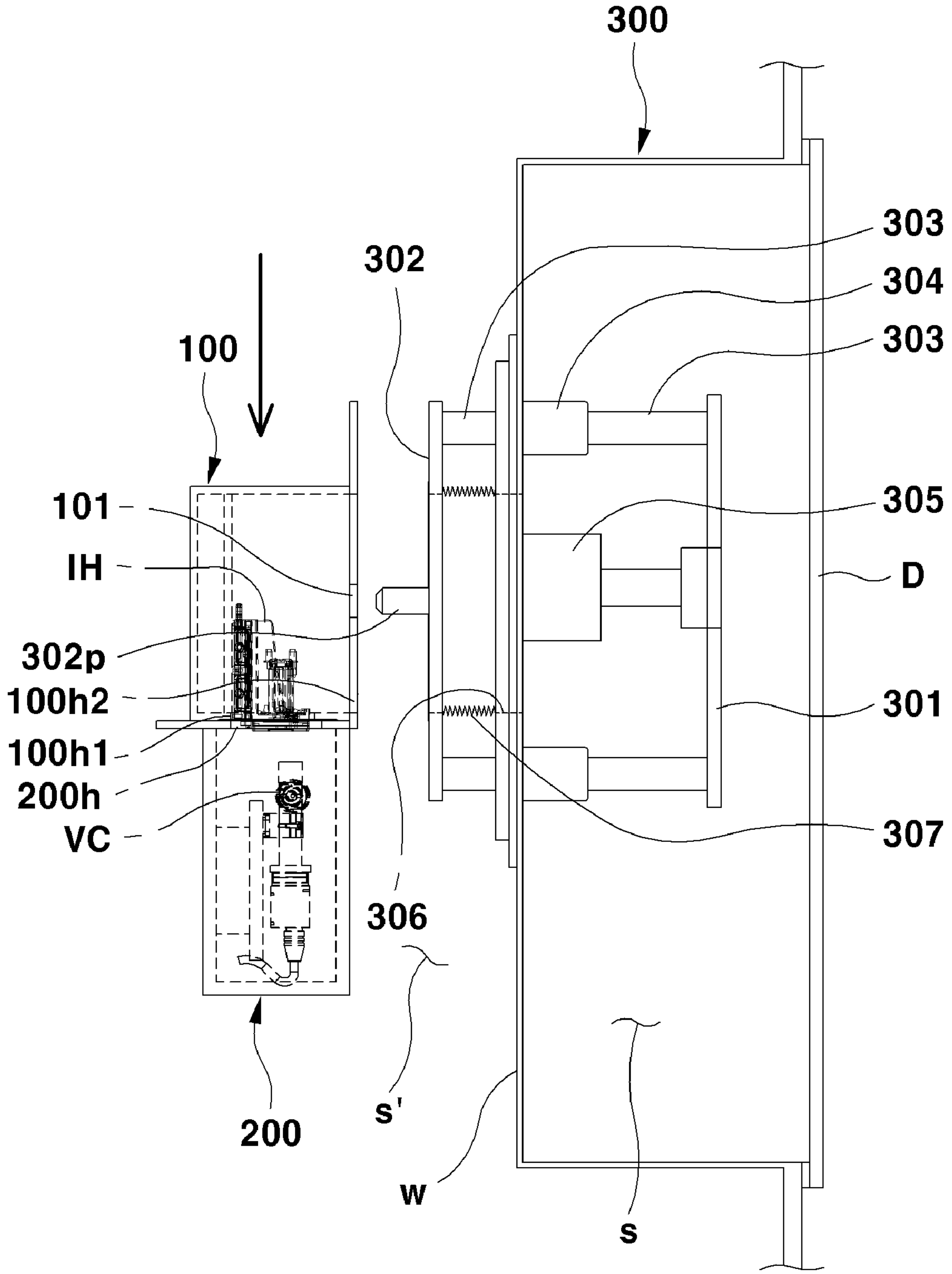
Figure 9:
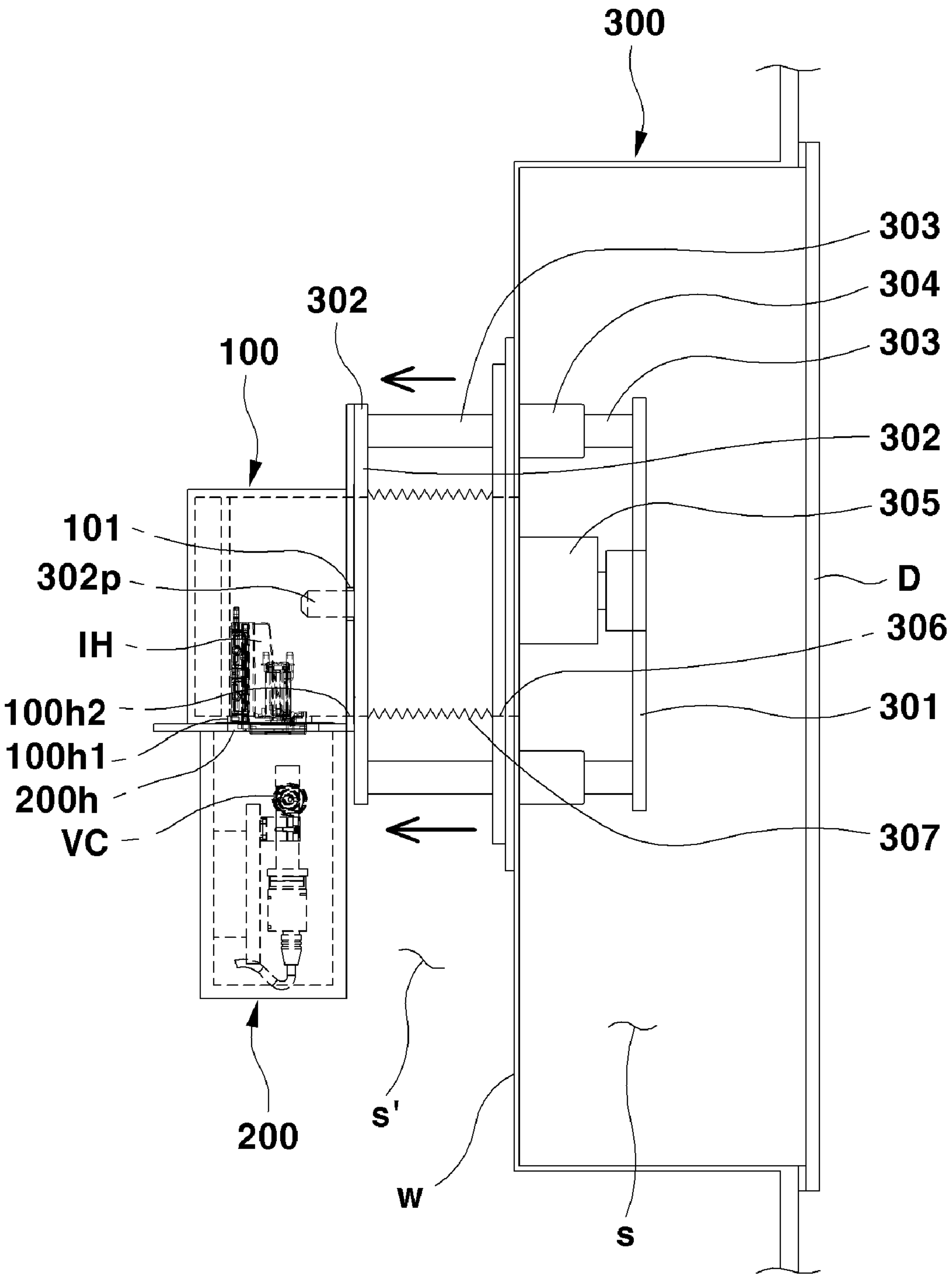
Figure 10:
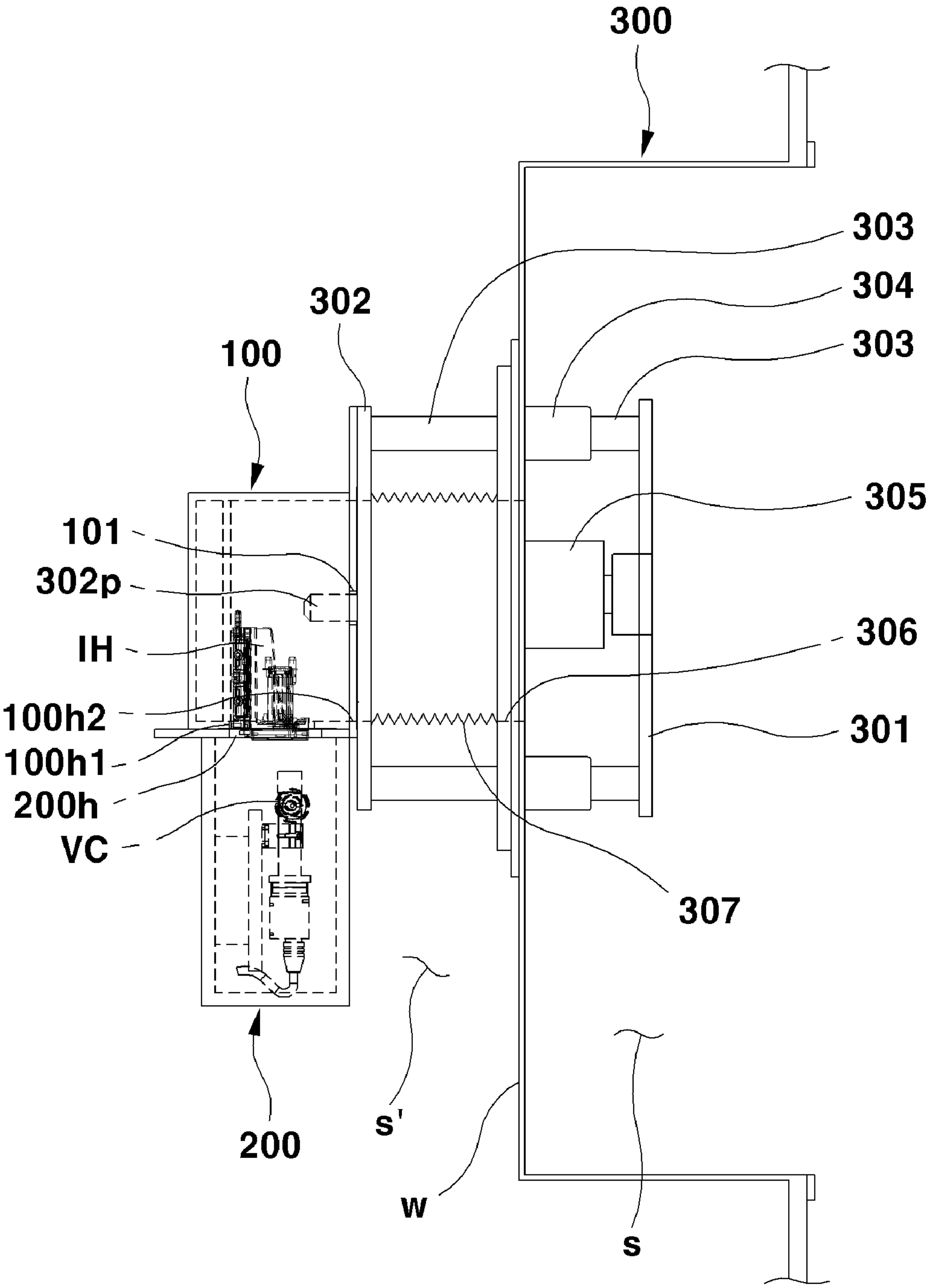

Thereafter, as illustrated in FIG. 8, as at least one of the process unit moving chamber 100 and the management unit moving chamber 200 is moved in the Z-axis direction, the process unit moving chamber 100 and the management unit moving chamber 200 come into close contact with each other.

Thereafter, while the process unit moving chamber 100 and the management unit moving chamber 200 maintain a close contact state, the process unit moving chamber 100 is aligned in correspondence with a Z-axis coordinate of the fixed chamber 300.

As described above, in a state in which the process unit moving chamber 100 and the management unit moving chamber 200 come into close contact with each other, and the process unit moving chamber 100 is aligned to the fixed chamber 300, the driving unit 305 is driven so that the outer frame 301 is moved close to the wall part W of the enclosure 1, and through this, the docking frame 302 and the process unit moving chamber 100 come into close contact with each other.

Through the above-described process, as the first maintenance opening hole **100*h*1 and the management opening hole 200*h* communicate with each other as the process unit moving chamber 100 and the management unit moving chamber 200 come into close contact with each other, and the second maintenance opening hole 100*h*2 and the docking opening hole 306 communicate with each other as the process unit moving chamber 100 and the fixed chamber 300 come into close contact with each other, one sealed space may be formed by the process unit moving chamber 100, the management unit moving chamber 200, and the fixed chamber 300**.

In a state in which one sealed space is formed by the process unit moving chamber 100, the management unit moving chamber 200, and the fixed chamber 300, as the CDA is supplied through the air supply hole to discharge the atmosphere gas through the exhaust hole while detecting a pressure state and a gas state in the sealed space, an environment in which a worker is able to work is created.

When it is checked that the environment in which a worker is able to work is created, the worker may perform maintenance or replacement of the inkjet head module IH by opening the door D of the enclosure 1 to approach hands into the sealed space through the central rectangular opening of the outer frame 301, the central rectangular opening of the docking frame 302, and the rectangular docking opening hole 306.

When the work of the worker is completed, as the door D of the enclosure 1 is closed, and the atmosphere gas is supplied through the gas supply hole to discharge the CDA, the original process environment is created.

In addition to the above-described operations of the process unit moving chamber 100, the management unit moving chamber 200, and the fixed chamber 300, the method for forming one sealed space by the process unit moving chamber 100, the management unit moving chamber 200, and the fixed chamber 300 may be variously changed. For example, the process unit moving chamber 100 may be moved and aligned in correspondence with the X-axis coordinate of the management unit moving chamber 200 and the Z-axis coordinate of the fixed chamber 300, and in a state in which the management unit moving chamber 200 is moved and aligned in correspondence with the Y-axis coordinate of the process unit moving chamber 100, the process unit moving chamber 100 and the management unit moving chamber 200 may come in close contact with each other as the management unit moving chamber 200 is moved in the Z-axis direction, and then the docking frame 302 and the process unit moving chamber 100 may come in close contact with each other.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An enclosure system comprising:

a process unit moving chamber comprising a first maintenance opening hole through which one side portion of a process unit is exposed and a second maintenance opening hole through which the other side portion of the process unit is exposed, the process unit moving chamber moving integrally with the process unit;

a management unit moving chamber comprising a management opening hole through which a management portion of a management unit is exposed and moving integrally with the management unit; and a fixed chamber connected to a door installed at one side wall part of an enclosure to form a predetermined space, the fixed chamber comprising a docking opening hole extending toward the inside of the enclosure, wherein, through movement of the process unit and the management unit, the process unit moving chamber and the management unit moving chamber come in close contact with each other to allow the first maintenance opening hole and the management opening hole to communicate with each other, the process unit moving chamber and the fixed chamber come in close contact to allow the second maintenance opening hole and the docking opening hole to communicate with each other, and thus the process unit moving chamber, the management unit moving chamber, and the fixed chamber form one sealed space.

2. The enclosure system of claim 1, wherein the process unit moving chamber has a rectangular shape, the first maintenance opening hole is formed in a bottom surface thereof, and the second maintenance opening hole is formed in one side surface thereof, the management unit moving chamber has a rectangular shape, and the management opening hole is formed in a top surface thereof, and the fixed chamber has a rectangular shape, and the docking opening hole is formed in a direction facing the second maintenance opening hole.

3. The enclosure system of claim 2, wherein the fixed chamber comprises:

an outer frame having an opened central portion and disposed in a space of the fixed chamber;

a docking frame having an opened central portion and disposed in the enclosure;

a plurality of connecting rods passing through the inside and outside of the enclosure to integrally connect the outer frame and the docking frame;

a guide bushing which is disposed in the enclosure to allow the plurality of connecting rods to slide in a longitudinal direction and into which the plurality of connecting rods are inserted;

a driving unit configured to provide driving force so that the plurality of connecting rods slide in the longitudinal direction;

the docking opening hole formed in the enclosure in correspondence with an opening of the outer frame and an opening of the docking frame; and a flexible connecting pipe configured to connect the docking opening hole and the opening of the docking frame.

4. The enclosure system of claim 3, wherein a flange part extends from one side surface of the process unit moving chamber, and at least one guide hole is formed in one of the flange part and a corresponding surface of the docking frame facing the flange part, and a guide pin inserted into the guide hole is formed on the other.

5. The enclosure system of claim 3, wherein a first O-ring groove is formed in one of an outer periphery of the first maintenance opening hole and an outer periphery of the management opening hole, into which a first O-ring is inserted, and a first O-ring sealing surface facing the first O-ring groove to compress the first O-ring is formed on the other.

6. The enclosure system of claim 3, wherein a second O-ring groove is formed in one of an outer periphery of the second maintenance opening hole and an outer periphery of the opening of the docking frame, into which a second O-ring is inserted, and a second O-ring sealing surface facing the second O-ring groove to compress the second O-ring is formed on the other.

7. The enclosure system of claim 1, wherein a sensor unit configured to detect a pressure state and a gas state is disposed on one of the process unit moving chamber, the management unit moving chamber, and the fixed chamber.

8. The enclosure system of claim 1, wherein a gas supply hole through which an atmosphere gas is supplied, an air supply hole through which clean dry air (CDA) is supplied, and an exhaust hole through which the atmosphere gas or the CDA is exhausted are formed in one of the process unit moving chamber, the management unit moving chamber, and the fixed chamber.

9. The enclosure system of claim 1, wherein when a horizontal direction on a plane of the enclosure is an X-axis, a vertical direction on the plane of the enclosure is a Y-axis, and a height direction of the enclosure is a Z-axis, the process unit is movable in an X-axis direction and a Z-axis direction, and the management unit is movable in a Y-axis direction and the Z-axis direction, in a state in which the process unit moving chamber is moved and aligned in correspondence with an X-axis coordinate of the management unit moving chamber, and the management unit moving chamber is moved and aligned in correspondence with a Y-axis coordinate of the process unit moving chamber, the process unit moving chamber and the management unit moving chamber come in close contact with each other as at least one of the process unit moving chamber and the management unit moving chamber is moved in the Z-axis direction, and the process unit moving chamber is aligned in correspondence with a Z-axis coordinate of the fixed chamber while maintaining the state in which the process unit moving chamber and the management unit moving chamber come in close contact with each other.

10. The enclosure system of claim 1, wherein when a horizontal direction on a plane of the enclosure is an X-axis, a vertical direction on the plane of the enclosure is a Y-axis, and a height direction of the enclosure is a Z-axis, the process unit is movable in an X-axis direction and a Z-axis direction, and the management unit is movable in a Y-axis direction and the Z-axis direction, and in a state in which the process unit moving chamber is moved and aligned in correspondence with an X-axis coordinate of the management unit moving chamber and a Z-axis coordinate of the fixed chamber, and the management unit moving chamber is moved and aligned in correspondence with a Y-axis coordinate of the process unit moving chamber, the process unit moving chamber and the management unit moving chamber come in close contact with each other as the management unit moving chamber is moved in the Z-axis direction.

11. The enclosure system of claim 1, wherein the management unit disposed in the management unit moving chamber comprises at least one vision inspection device of a maintenance vision inspection device for maintaining the process unit and an operation checking vision inspection device for inspecting an operation state of the process unit.

* * * * *